United States Patent [19]

Hepp

[11] 3,996,919

[45] Dec. 14, 1976

[54] SYSTEM FOR COLLECTING AND STORING SOLAR ENERGY

[75] Inventor: Peter S. Hepp, Media, Pa.

[73] Assignee: Sun Oil Company of Pennsylvania, Philadelphia, Pa.

[22] Filed: Nov. 21, 1975

[21] Appl. No.: 634,229

[52] U.S. Cl. .............................. 126/270; 126/400; 165/105; 237/1 A

[51] Int. Cl.² .......................................... F24J 3/02

[58] Field of Search ................. 126/270, 271, 400; 237/1 A; 165/105, 18; 60/641; 202/234

[56] References Cited

UNITED STATES PATENTS

| | | | |
|---|---|---|---|
| 1,971,242 | 8/1934 | Wheeler | 126/271 |
| 3,799,144 | 3/1974 | Ramsey et al. | 126/270 |
| 3,875,926 | 4/1975 | Frank | 126/271 |
| 3,923,038 | 12/1975 | Cutchaw | 126/271 |

Primary Examiner—Kenneth W. Sprague
Assistant Examiner—James C. Yeung
Attorney, Agent, or Firm—J. Edward Hess; Donald R. Johnson; Gary V. Pack

[57] ABSTRACT

A system for collecting and storing solar energy which includes solar panels which are installed between the joists of the roof so that the collector surface of each panel acts as part of the roof of each panel, and also includes a heat storage system connected to the back side of each panel. Each heat storage system has a plurality of heat storage cylinders containing a phase change, heat storage mixture and a heat pipe for conducting the heat collected by the collector surface to the heat storage material. The containers of heat storage material extend into ductwork connected to a conventional forced air heating system so that the air is heated when it is circulated around the heat storage cylinders. The heat storage system can be used with a flat solar collector surface as well as with a parabolic reflector for focusing sunlight on the end of the heat pipe. An alternative embodiment uses individual solar absorbing panels for each heat pipe which permits alignment of the collector surface in the most efficient direction.

7 Claims, 8 Drawing Figures

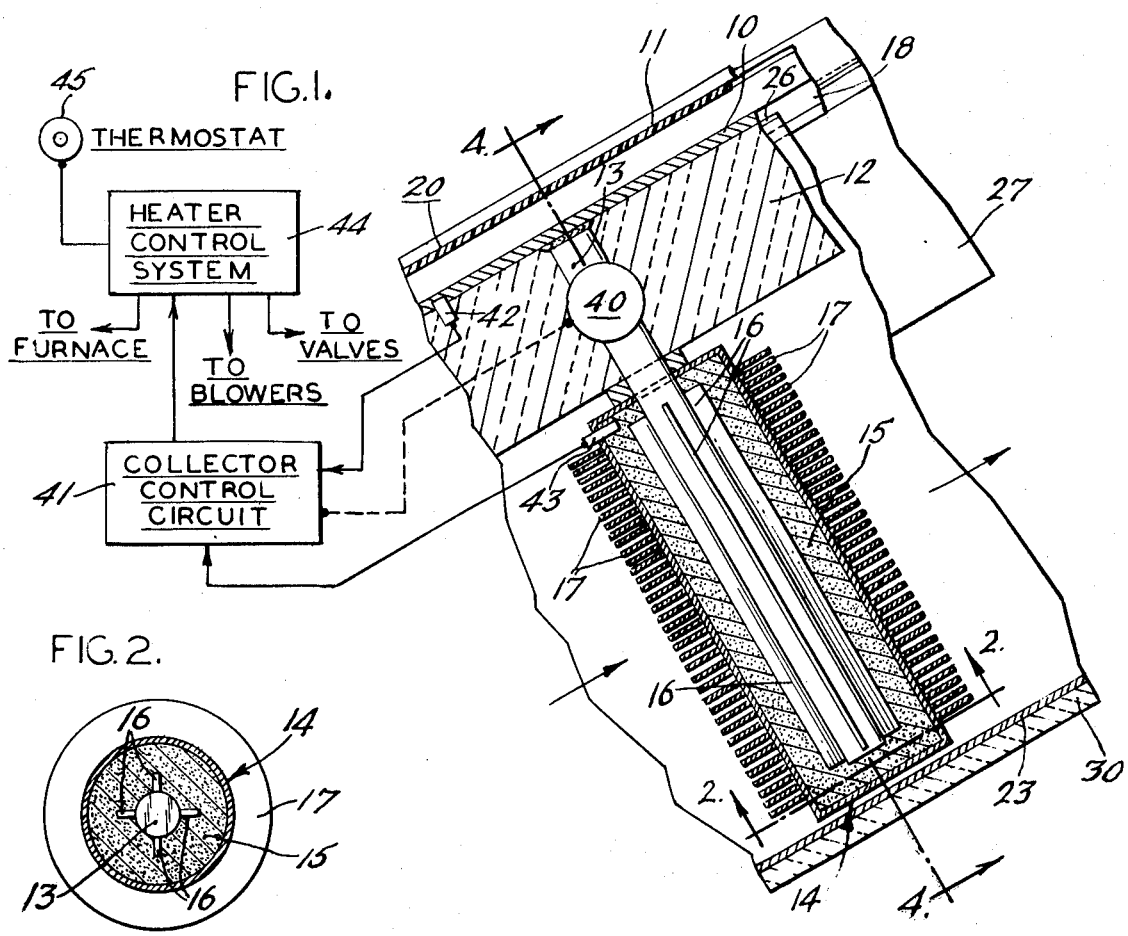
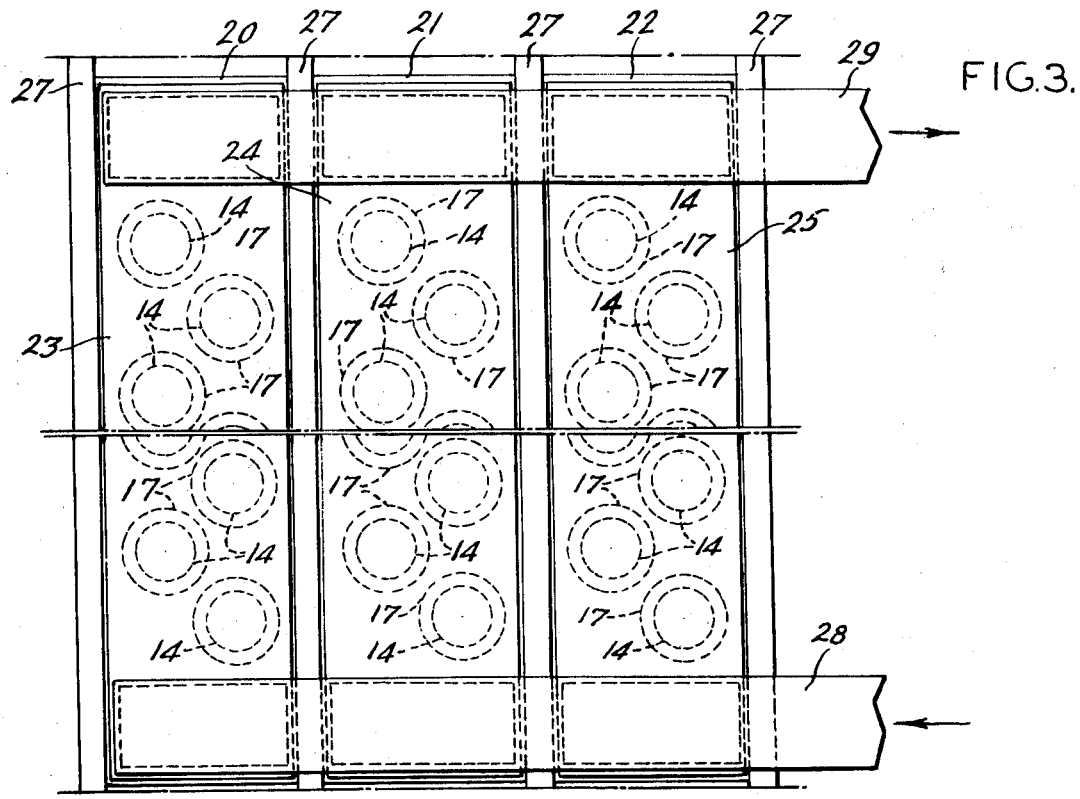

SYSTEM FOR COLLECTING AND STORING SOLAR ENERGY

BACKGROUND OF THE INVENTION

This invention is related to systems for collecting solar energy from the sun and more particularly to a system for collecting solar energy which uses a heat pipe to transfer the heat collected to a heat storage system.

There are many collector designs for receiving the energy from the sun and using it to heat a building. However, most of these designs prove to be quite impractical because of the costs involved in manufacturing such a system, inefficiency caused by heat losses, and the problems with retrofitting an existing building with solar energy collectors at a price which makes it economically attractive. Another problem with most collectors, is that the appearance of the collectors on the roof detracts from the beauty of the building and is usually not very aesthetically appealing.

Most flat plate collector designs range from having at one heat absorbing surface and a transparent cover to many heat absorbing layers with fluid spreaders and several covers. While some of these designs work very efficiently, they can be quite intricate and expensive to manufacture and usually require an auxiliary means for storing the heat collected, such as a large pebble bed or large water tank. Because of the weight of such storage systems, they must be located in the basement or garage, which often results in lengthy flow paths for the working fluid, thereby increasing costs and reducing efficiency.

SUMMARY OF THE INVENTION

In accordance with a preferred embodiment, a solar energy collector system is provided which uses a heat-pipe to transfer the heat collected to a heat storage system located directly beneath the collector. The collector system is designed so that it can be manufactured in the form of prefabricated panels which can be mounted between the joists of a roof and take the place of the roof. The heat storage system contains a plurality of heat storage containers having a phase changing heat storage material, such as an eutectic salt, which are connected to the collector surface by a heat pipe. The number of containers required depends on the location, size, and load requirements for the house. In one embodiment, the collector surface is formed out of a metal sheet which has a black finish and protected from the weather by a transparent cover. The bottom of the metal sheet is insulated to prevent the loss of heat. Ductwork, which is connected to the forced air heating system, encloses the heat storage system so that when heat is needed in the building, the air is heated by circulating it around the heat storage containers before it enters the rooms.

The number of solar panels and the number of heat storage cylinders for each panel would have to be specifically determined for each building, taking into account factors such as the strength of the structure, the angle of the roof, the direction the roof faces, the heat requirements for the building, as well as the potential benefit that can be derived from such a system in view of the overall costs.

One advantage to the system is that each panel can be manufactured in a size that will fit most buildings and can be easily installed as part of the roof. Using a conventional forced air heating system as the backup system minimizes the amount of extra ductwork required for using the solar collector which in turn minimizes the heat losses often experienced on many solar heating systems. Use of a hot air heating system also eliminates leakage problems, often found in solar heating systems using water as the working fluid.

A second embodiment includes the use of a parabolic reflector to focus the sun on the end of the heat pipe. An alternative embodiment is provided in which small collector sections are mounted on the end of the heat pipe in a rotatable fashion which permits alignment of the collector surface in the direction for receiving maximum solar energy.

A better understanding of the invention and its advantages can be seen in the following description of the figures and preferred embodiment.

DESCRIPTION OF THE FIGURES AND PREFERRED EMBODIMENT

FIG. 1 is a partial section of a heat storage cylinder of the solar panel with a schematic diagram of a control system.

FIG. 2 is a section of the heat storage cylinder in FIG. 1 along the line 2—2.

FIG. 3 illustrates three collector panels installed between the joists of the roof and enclosed in the ductwork, as viewed from below the panels.

Figure 4:
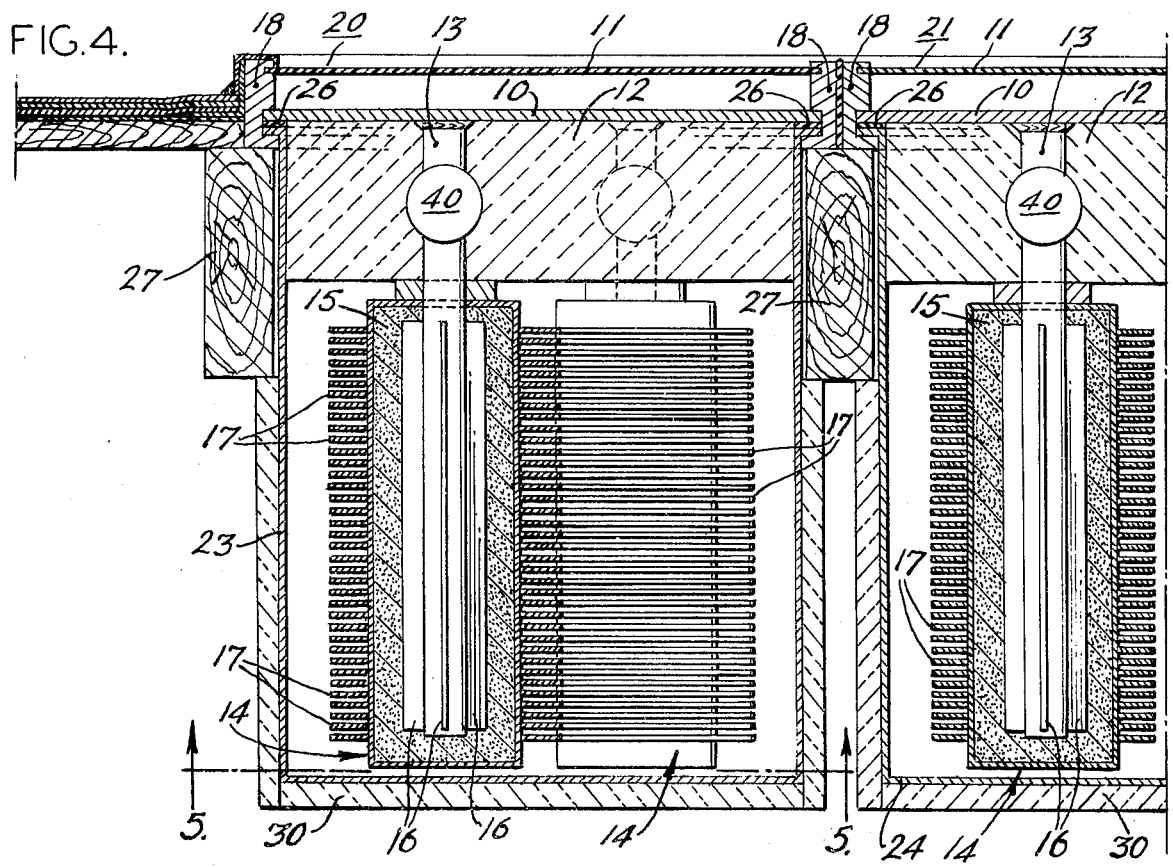
FIG. 4 is an enlarged section showing the installation of two collector panels between the joists of the roof.
Figure 5:
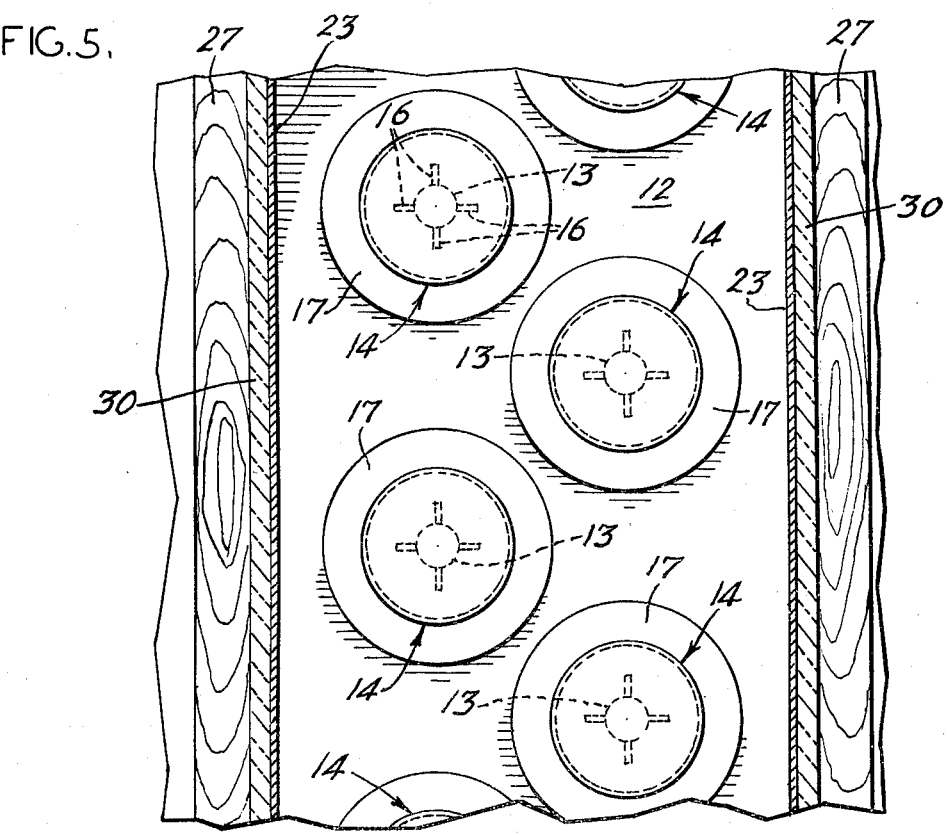
FIG. 5 is a section taken along the line 5—5 in FIG. 4.

Each solar collector panel has a heat absorbing plate 10 and its own heat storage system which includes a plurality of heat storage cylinders mounted on the back side of heat absorbing plate 10 as illustrated in FIG. 1. Heat absorbing plate 10 can be a metal sheet such as copper, aluminum or galvanized steel, covered with a flat black coating or a selective coating. A transparent cover 11 helps to protect the surface of heat absorbing plate 10 from deterioration as well as to reduce convection losses. The bottom side of absorbing plate 10 is covered with a layer of insulation, 12, to prevent heat loss.

A heat pipe 13 is mounted to the underside of heat absorbing plate 10 to transfer the heat collected to heat storage cylinder 14. Heat pipe 13 can have one of many designs which are currently available. The construction and operation of the heat pipe are well known. The heat pipe has a closed, evacuated chamber with the inside walls lined with a capillary wick which is saturated with a volatile working fluid. Upon application of heat at one end of the heat pipe, the working fluid at that end is vaporized and driven to the cool end of the heat pipe where it is condensed. Capillary action in the wick causes the working fluid to return to the heated end of the heat pipe. The heat pipe provides an extremely efficient method of transferring the heat absorbed by plate 10 to heat storage cylinder 14 since its thermal conductance can range from several hundred to more than a thousand times the thermal conductance of copper. The heat pipe has other advantages which make it particularly applicable in such a solar collector and storage system. It can transfer heat with a small temperature drop and can transfer a relatively large amount of heat with respect to its size and weight. It operates automatically, is noiseless, and has a long life with minimum loss in efficiency.

Heat storage cylinder 14, in which the cooling end of heat pipe 13 is embedded, can contain a phase changing material such as a eutectic salt mixture, which has a high heat absorption to volume ration. A plurality of fins 16 extend longitudinally along the outside surface of heat pipe 13 and into heat storage material 15 to provide more efficient distribution of the heat conducted from heat absorbing plate 10. The outside surface of cylinder 14 also has a plurality of fins 17 for better transfer of heat to the air circulated around the cylinders.

Each collector panel, which can be located between the joists of the roof, has a plurality of heat storage cylinders 14, the number depending upon the requirements of the particular building as well as other factors.

A heat exchanging system is mounted directly below each collector panel. The heat exchanger design illustrated in the figures is for use with a forced air system. In this design the space below each collector panel and the heat storage cylinders, 14, are enclosed by conventional ductwork which can be connected to the ducts on a conventional forced air heating system. For purposes of heating household water, however, it may be more efficient to circulate a liquid heat exhange fluid around each heat storage cylinder 14. Designing heat exchange systems to perform this function is within the capabilities of one skilled in the art.

The exact design of the ductwork can vary. However, the design illustrated in FIGS. 3 and 4 is particularly desirable since it can be pre-assembled with the collector panel and installed as one piece. Each collector panel 20, 21 and 22 has a duct 23, 24 and 25 suspended below it, having the upper edge of each duct 23, 24 and 25 secured within their respective collector panel frame 18 and separated from heat absorbing plate 10 by an insulating gasket 26. Each collector panel assembly can then be placed between the joists 27 of the roof of a house and appropriately sealed in place to prevent leakage. Openings in the bottom and top of each duct 23, 24 and 25 permit connection to inlet manifold 28 and outlet manifold 29. A layer of insulation 30 attached to ducts 23, 24 and 25 helps to minimize heat losses.

Figure 6:
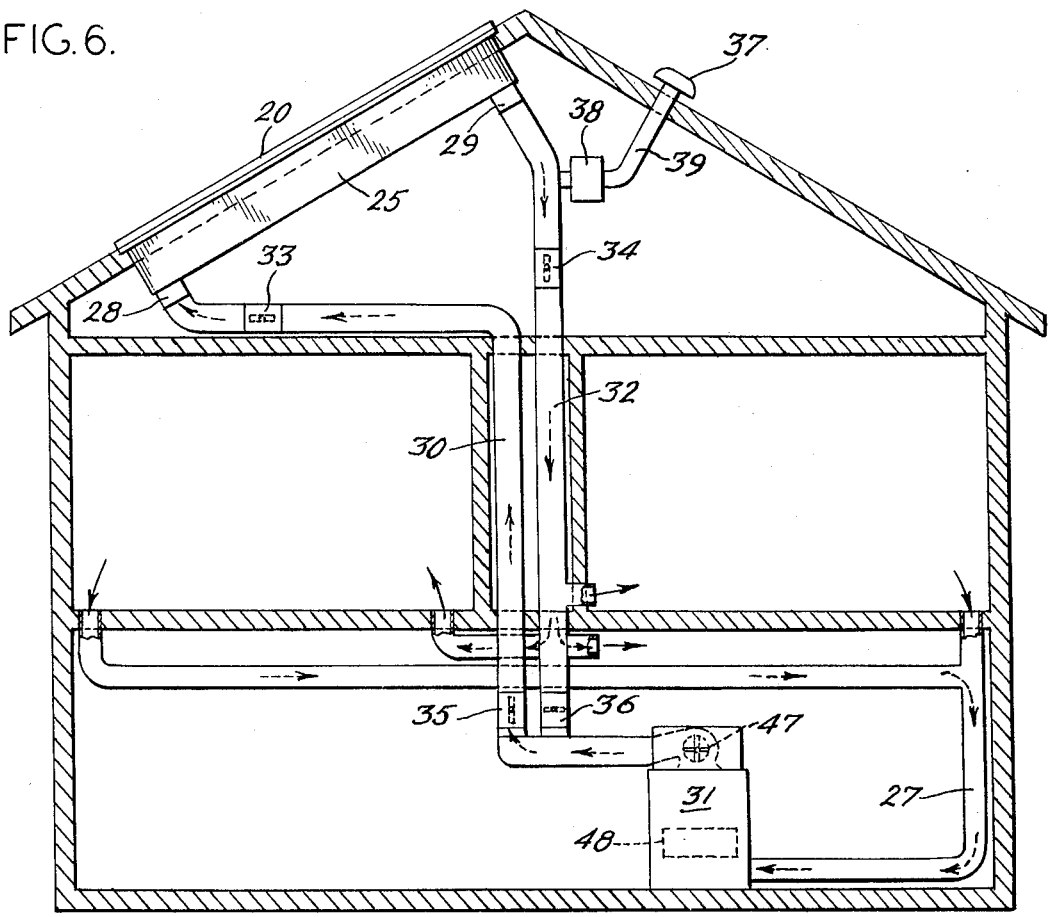
FIG. 6 illustrates one method of connecting the collector panels to a conventional forced air heating system, with arrows indicating the air flow pattern throughout the system when the collector panels are being used.

The entire collector panel system can be installed in a building in many ways. One design for installation with a forced air system which can be used for retrofitting a building as well as in a new building, is illustrated in FIG. 6. For this design, only the installation of an extra duct, 30, from the exhaust end of the existing furnace 31 to inlet manifold 28 of the collector panel bank is required for retrofitting. Outlet manifold 29 of the collector panels would then be connected to the central heat duct 32 for the existing system. Valves 33, 34, 35 and 36 are used to control the direction of the air forced through the system depending upon whether or not there is sufficient heat to use the solar collectors and may be of the type which can be actuated by a solenoid control. A vent 37 is connected to duct 32 through heat sensitive valve 38 and duct 39 so that if the heat within the duct system builds up to a certain temperature, the vent will allow it to escape.

When using heat pipes to conduct the heat absorbed from the sun away from the solar collector a problem arises when the temperature of the collector absorber plate falls below the temperature in the heat storage cylinder, since the heat pump will now begin to operate in a reverse direction, conducting the heat stored back to the collector. One solution to this problem is to use a valve, 40, located in the heat pipe, which is closed when the temperature on the collector absorber layer falls below that in the heat storage cylinder or falls within a predetermined temperature difference. Elaborate heat pipe valves which will perform this function have been patented and are well known in the art.

The valve control system for control valve 40 of heat pipe 13 includes a collector control circuit 41 which is connected to temperature sensors 42 and 43 for monitoring the temperature of heat absorbing plate 10 and heat storing material 15. Control circuit 41 can be programed to turn valve 40 off when there is not enough heat being absorbed by heat absorbing plate 10 to significantly contribute to the supply of heat in heat storage cylinder 14, thereby preventing reverse flow of heat through heat pipe 13 during periods of limited sunlight or at night. Electronic systems to perform this function are well known in the art. To minimize costs, only one collector control circuit is required to control the valves on all the heat pipes. Monitoring the temperature in one location on heat absorber plate 10 and one of the heat storage cylinders 14 should provide a sufficient prediction of the conditions throughout the entire collector and heat storage system.

The collector control circuit 41 can also be designed to send a signal to heater control system 44 which indicates that a sufficient amount of heat is being stored in heat storage cylinders 14 to provide heat for the building. Heater control system 44 is provided to determine which heating system will heat the building when the thermostat indicates heat is needed. Heater control system 44 receives a signal from collector control circuit 41 indicating the amount of heat stored in the solar system and sets the position of valves 33, 34, 35 and 36 and a control for the conventional heater in the required mode. When thermostat 45 indicates the need for heat, the circulating blower is turned on. Depending upon the signal received from collector control circuit 41, heat will be provided by the furnace or heat storage system for the collectors.

The operation of the solar collector panel and heat storage system in conjunction with a conventional backup heating system will now be described. On a day with sufficient sunlight, heat absorbing plate 10 will become quite hot due to the sunlight falling on its surface. This heat will cause the working fluid in heat pipe 13 to boil and flow to the opposite, cooler end where it will be condensed and the heat storage material, 15, will absorb the heat given off by the condensation. During this process, collector control circuit 41 has sensed that the temperature of heat absorber plate 10 is above that in heat storage material 15, which causes heat pipe valve 40 to remain in its open position. Once the sun sets or is sufficiently covered by clouds and the temperature of absorber plate 10 falls below that in heat storage material 15, heat pump valve 40 will then be closed to prevent the loss of heat from heat storage cylinder 14.

When heater control system 44 receives a signal from collector control circuit 41 which indicates that a sufficient quanity of heat is stored in the heat storage system, valve 35 is placed in the open position and valve 36 is placed in the closed position. While no air is being circulated through the collectors, valves 33 and 34 remain closed to minimize heat loss from the air around the heat storage cylinders 14. The furnace control is also conditioned so that when thermostat 45 turns blower 47 on, heat element 48 does not turn on. When blower 47 is turned on, valves 33 and 34 are opened and air is circulated up duct 30, in inlet manifold 28, through the heat storage system for each collector panel, out through outlet manifold 29, and into each room through duct 32. Air returns to blower 47 through return duct 27.

If collector control circuit 41 indicates not enough heat is stored in the heat storage system, heater control system causes valves 33, 34 and 35 to close and valve 36 is opened. When blower 47 is turned on by thermostat 45, heater element 48 is also turned on and hot air is forced into the rooms through duct 32.

Figure 7:
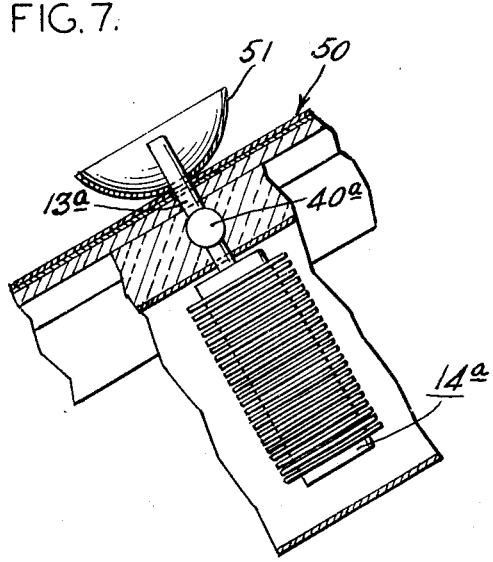
FIG. 7 illustrates a second embodiment of the solar energy collection system using a parabolic reflector to reflect the sun on the end of a heat pipe.

A second embodiment of the solar collector and heat storage system is illustrated in FIG. 7. In this design the end of the collector is extended through the roof level, 50, and a parabolic reflector 51 is mounted on this end to focus the sun's rays on the end of the collector. Included in this design is a heat storage cylinder 14a and a heat pipe valve 40a. This design has its limitations since parabolic reflectors require direct sunlight to be efficient and must track the sun's position. However, in certain areas of this country, the consistently clear weather could justify the cost of such a system.

Figure 8:
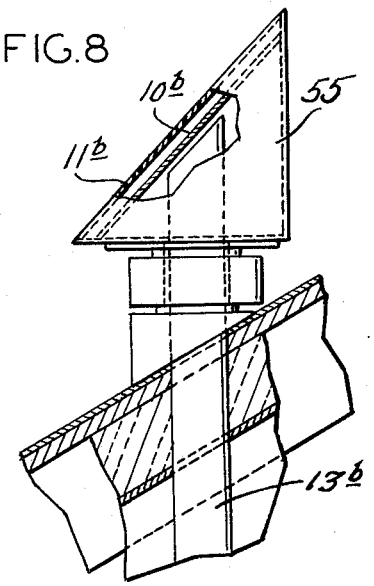
FIG. 8 illustrates an alternative embodiment having individual rotatable collector surfaces for each heat storage system.

An alternative embodiment is illustrated in FIG. 8. This design has been specifically developed for use on buildings not having a roof facing in a southerly direction. This alternative embodiment has heat pipe 13b extending above a cover surface and a rotatable collector surface 55 mounted on the top of heat pipe 13b. The rotatable collector has a heat absorbing plate 10b as well as a transparent cover 11b. With this feature, the collector surface can be set at installation to face the optimum direction for receiving sunlight.

While a particular embodiment of this invention has been shown and described, it is obvious that changes and modifications can be made without departing from the true spirit and scope of the invention. It is the intention of the appended claims to cover all such changes and modifications.

The invention claimed is:
1. A solar energy collection and heat storage system comprising:
   a. means for absorbing the heat from the sun;
   b. a plurality of heat pipes, each having a first end mounted to the solar heat absorbing means;
   c. means, surrounding the free end of each heat pipe, for storing the heat collected by the solar heat absorbing means and conducted to the free end of each heat pipe through the heat pipe itself, said storage means having an uninsulated and heat conductive outside surface to enable the heat stored to be conducted to the surrounding space; and
   d. means, responsive to the temperature of the solar heat absorbing means being less than the temperature of the heat storage means, for preventing the conduction of heat through the heat pipes from the heat storage means to the heat absorber means, so that the heat stored in the heat storage means is not lost to the heat absorbing means.

2. The system recited in claim 1, wherein the heat storage means comprises a container holding a heat storage material, in which the free end of the heat pipe is located, the heat storage material being a phase changing material stores heat by changing from one phase to the next phase.

3. The system recited in claim 1, wherein the solar heat absorbing means comprises:
   a. a heat absorbing plate with a black coating on one side, having the other side mounted to the first end of the heat pipe; and
   b. a transparent cover mounted above the heat absorbing plate on the side having the black coating, so that convection losses are minimized and the black coating is protected.

4. The system recited in claim 1, wherein the solar heat collection means comprises a parabolic reflector mounted on the first end of the heat pipe for concentrating the sun's rays on that end of the heat pipe.

5. The system recited in claim 1, further comprising:
   a. means for providing a fluid flow path around the heat storage means for the heat pipes so that heat transfer fluid can be circulated around the heat storage means to absorb the heat contained therein and circulated at another location to provide heat at that location.

6. The system recited in claim 5 wherein the heat absorbing means comprises a plurality of individual heat absorbing plates and transparent covers, each heat pipe having its respective heat absorbing plate and the transparent cover mounted in a rotatable manner on the first end of the heat pipe so that each heat absorbing plate can be aligned to have the optimum angle to the sun.

7. A solar energy collection panel having both a heat storage system and a heat exchanger system integrally combined as one unit, and comprising:
   a. a flat, heat absorber plate having a black coating on one side;
   b. a transparent cover mounted above the heat absorbing plate on the side having the black coating, so that the convection losses are minimized and the black coating is protected;
   c. a plurality of heat pipes, each having one end mounted to the side of the heat absorbing plate without the black coating;
   d. a plurality of heat storage containers having a heat storage material, each heat storage container surrounding the free end of a heat pipe and having an uninsulated and heat conductive outside wall;
   e. means, responsive to the temperature of the heat absorber plate being less than the temperature of the heat storage containers, for preventing the conduction of heat through the heat pipes from the heat storage means to the heat absorber means, so that the heat stored in the containers is not lost to the heat absorber plate; and
   f. a duct, suspended from the heat absorber plate, enclosing the heat pipe and heat storage container combinations, and having an inlet and an outlet so that fluid entering the inlet, flows through the duct and around each heat storage container to be heated, and exits through the outlet.

* * * * *